United States Patent [19]

Cassat et al.

[11] Patent Number: 5,117,165
[45] Date of Patent: May 26, 1992

[54] CLOSED-LOOP CONTROL OF A BRUSHLESS DC MOTOR FROM STANDSTILL TO MEDIUM SPEED

[75] Inventors: Alain M. Cassat, Pully; Laurent Cardoletti, Montreux, both of Switzerland

[73] Assignee: Seagate Technology, Inc., Scotts Valley, Calif.

[21] Appl. No.: 546,374

[22] Filed: Jun. 29, 1990

[51] Int. Cl.$^5$ .................. H02P 6/62; H02K 29/00
[52] U.S. Cl. ..................... 318/254; 318/138
[58] Field of Search ............. 318/254, 138, 702, 778, 318/723, 696, 439

[56] References Cited

U.S. PATENT DOCUMENTS

| 3,909,688 | 9/1975 | Blaschke et al. | 318/702 |
|---|---|---|---|
| 4,641,066 | 2/1987 | Nagata et al. | 318/138 |
| 4,746,850 | 5/1988 | Abbonoanti | 318/728 |
| 4,876,491 | 10/1989 | Squires et al. | 318/138 |
| 4,992,710 | 2/1991 | Cassat | 318/254 |
| 5,001,405 | 3/1991 | Cassat | 318/254 |

Primary Examiner—David Smith, Jr.
Attorney, Agent, or Firm—Flehr, Hohbach, Test, Albritton & Herbert

[57] ABSTRACT

The present method and apparatus detects the position with an accuracy of $\pi/m$ electrical radians (where m = the number of motor phases) within one electrical period, and provides enough information to be able to start in the correct direction with certainty.

More specifically, the position at start is determined by the injection of short current pulses in different motor phases, each phase or pair of phases being energized first by a pulse of one polarity and of the opposite polarity. The sign of the difference between the induced voltage is detected. By performing a succession of these tests on different phases or pairs of phases of the standing motor, a table of results is established which clearly defines the position of the rotor relative to the motor phases. The same table then defines what polarity currents should be applied to each phase to reliably and certainly start the motor in the proper direction.

Additionally, a method and apparatus is presented which uses the static position detection method to accelerate the motor to a medium speed. The method shortens the duration of the drive pulse as the motor accelerates ensuring a smooth acceleration without the possibility of back oscillation.

28 Claims, 9 Drawing Sheets

FIG.—1

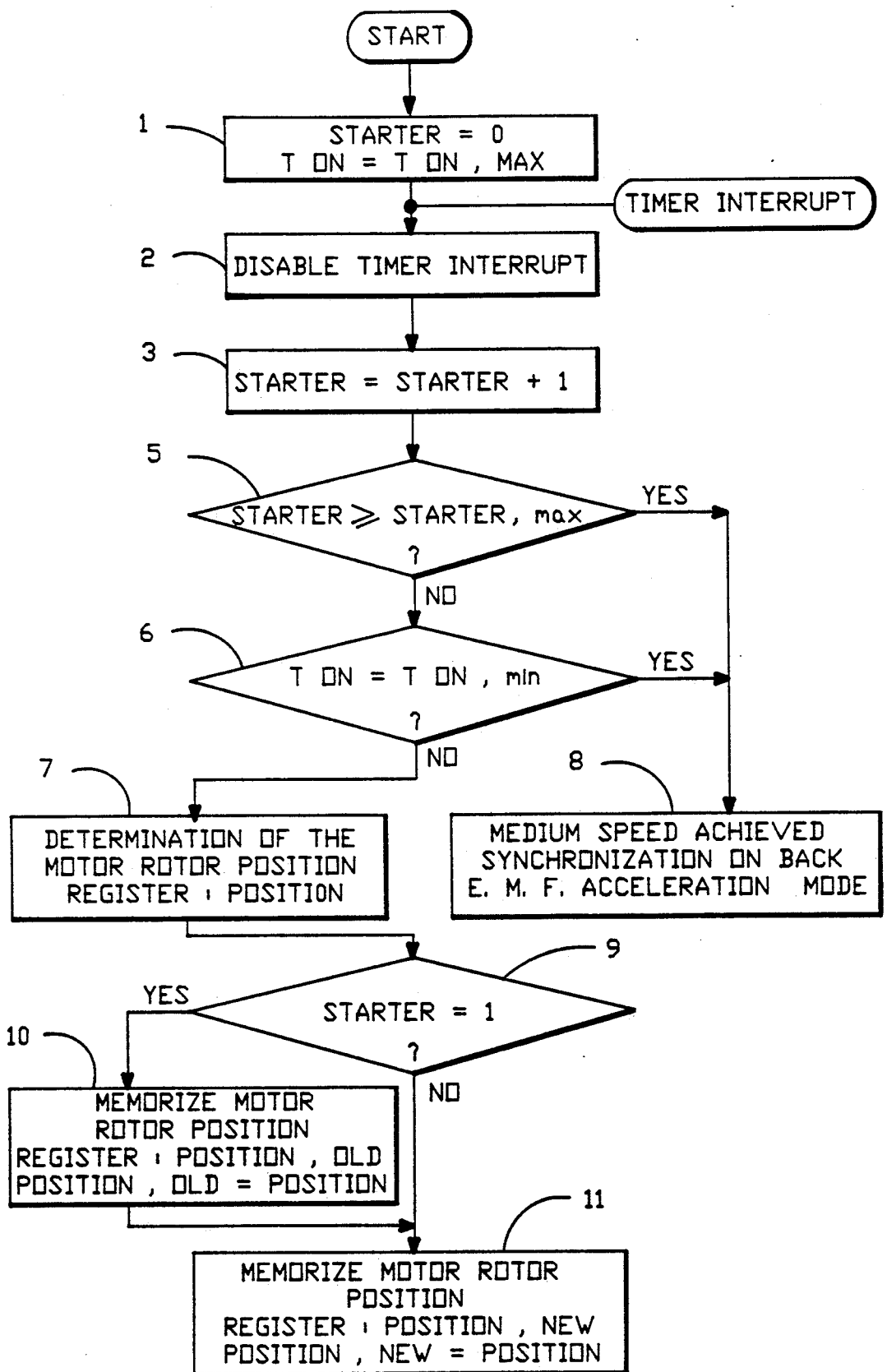
FIG.—6A

CLOSED-LOOP CONTROL OF A BRUSHLESS DC MOTOR FROM STANDSTILL TO MEDIUM SPEED

CROSS-REFERENCE TO A RELATED APPLICATION

The present invention is useful in a motor such as shown in U.S. application, Ser. No. 115,268, filed Oct. 30, 1987.

The present invention uses the method "Position Detection for a Brushless DC Motor" shown in U.S. application, Ser. No. 413,311 now U.S. Pat. No. 5,001,405.

Both of the above applications are incorporated herein by reference.

FIELD OF THE INVENTION

The present invention relates to method and apparatus for use with a brushless DC motor providing the capability of driving the motor from zero speed (standstill) to medium speed, without the use of known rotor position detecting elements such as Hall elements. The method presented here applies to any type of motor having an excitation flux created by a permanent magnet or by DC current excitation of a winding.

BACKGROUND OF THE INVENTION

Briefly stated, a brushless DC motor is a motor in which the position of magnetic poles of a rotor are determined by means of a detector directly coupled to the shaft of the rotor. In response to the detected position, semiconductor switching elements such as transistors, thyristors or the like are turn on and off so as to continuously generate torque in the motor. Field windings or a multi-segment permanent magnet is used as a rotor.

. The torque is created by application of currents to stator or field windings in sequential order to produce a torque-inducing flux for moving the rotor. The DC currents are alternately switched about the field windings to create various current paths that produce magnetic flux orientations in a synchronized fashion. The magnetic flux so produced results in a torque on the rotor that causes the desired rotational movement. In order to ensure that current is applied to the proper motor phase, sensing devices are used to provide information about the position of the rotor. Typically, this information is derived by sensing circuits using Hall sensors, optical sensors or resolvers. These different systems do not provide an absolute position. However, enough information is provided to determine the relative position of the rotor within one electrical period. Therefore, it is possible using these devices to energize the motor in such a way that it starts in every case in the correct direction, and drive the motor up to a given speed.

Of these, the best known and most commonly used, especially in motors where economy and small size are of significant importance, are Hall sensors. However, the position of the Hall elements must be very precisely fixed. Further, the heat resistant properties of Hall elements are limited, so that deterioration of the characteristics of the motor can occur if the motor is heavily loaded. Another problem with these sensing device is that they are prone to failure. Thus, Hall devices significantly affect the overall reliability of the apparatus that incorporates them. Furthermore, incorporating Hall devices in the motor structure itself increases the motor size, cost, complexity and power consumption. A number of wire leads must also be provided to each Hall effect device to connect it to an information processor, i.e., a microprocessor or the like, external to the motor shell.

A number of different solutions to indirect position detection that do not require sensors have been developed. For example, methods disclosed to date include direct or indirect back EMF detection as disclosed in V. D. Hair, "Direct Detection of Back EMF in Permanent Magnet Step Motors," Incremental Motion Control Systems and Devices, Symposium, Urbana-Champaign, 1983, pp. 219-21, and K. M. King, "Stepping Motor Control," U.S. Pat. No. 4,136,308, Jan. 23, 1979; a current analysis disclosed in B. C. Kuo, A. Cassat, "On Current Detection in Variable-Reluctance Step Motors," Incremental Motion Control Systems and Devices, 6th Annual Symposium, Urbana-Champaign, 1977, pp. 205-20; and two third-harmonic analyses disclosed in P. Ferraris, A. Vagati, F. Villata, "PM Brushless Motor: Self Commutating Prerogatives with Magnetically Anisotropic Rotor," Instituto di Elettriche, Politecnico di Torino, Italia, and R. Osseni, "Modélisation et Auto-Commutation des Moteurs Synchrones", These EPFL No. 767, 1989. A rotor position location system using short current pulses has been disclosed in "Detection of Rotor Position in Stepping and Switched Motors by Monitoring of Current Waveforms" by P. P. Acarnley et al., printed in Transactions on Industrial Electronics, August 1985.

However, these methods have two major disadvantages. They do not provide any information about the position of the rotor at standstill and at low speeds, the back EMF signals are minute and not easily detected. Consequently, back EMF techniques are not practical at low to medium motor speeds.

One known effort to determine the starting position and driving the motor up to medium speed is disclosed in U.S. Pat. No. 4,876,491. According to this method, the position is determined by applying a short current pulse to each power phase of the motor. The resulting motor current is measured to determine the position of the rotor based on the return pulse of greatest amplitude. Having determined the rotor position, a given phase is energized for a constant duration producing torque and, consequently, accelerate the rotor. This procedure is repeated until the motor has reached a medium speed (for example, 720 rpm). For understanding: see FIG. 6A of U.S. Pat. No. 4,876,491.

However, this approach presents some disadvantages, including:

the rotor position determined may be inaccurate because the difference between the pulses returned from the different phases may be very small, and may be affected by temperature, differences between the phase inductances, or phase resistances, and noise;

energizing the selected phase for a constant interval producing a sustained torque is not adaptive to variable loads (different inertia) and may lead to rotor oscillation; and an outside device or element is necessary to provide speed information. (See U.S. Pat. No. 4,876,491).

SUMMARY OF THE INVENTION

The present method and apparatus detects the rotor position of a brushless DC motor with an accuracy of $\pi/m$ electrical radians (where m = the number of motor phases) within one electrical period, and provides enough information to start the motor in the correct direction with certainty and accelerate the rotor to a medium speed.

One aspect of the present invention is a method and apparatus to determine the rotor position using a current pulse injection and sampling technique. Each motor phase combination is successively applied a positive and negative polarity current pulse. In the preferred embodiment, the peak values of each pair of pulses are compared and the sign of the difference is stored in memory. By comparing the stored values for each phase combination, the position of the rotor can be accurately determined to within $\pi/m$ electrical radians.

In accordance with another feature of the invention, a select combination of motor phases are supplied with long duration current pulses based upon the rotor position. These pulses are applied for a predetermined duration in order to produce a sustained torque. Ideally, the sustained torque rotates the rotor to a new position; however, the frictional torque may be large enough to impede rotor motion.

In keeping with another aspect of the present invention, a method and apparatus determines if the motor has been accelerated via repetition of the position detection method. From the position information, a select combination of phases are energized with long duration current pulses to further accelerate the rotor. The duration of the energizing pulses is reduced by a fixed amount after each sequence of rotor position location and acceleration current application. In controlling the acceleration, the invention determines the duration during which a given combination of torque producing currents are applied to the motor phases. If the position detection system responds with a position which is the same as the previous determination, the duration of the applied torque producing current pulse is not decremented. This process of rotor position detection and corresponding current application for an adaptive time period is sequentially repeated until the motor has reached a medium speed.

Note that the approach used does not require any outside sensors. Therefore, significant improvements over the prior art in size, weight, power consumption, reliability and cost are realized.

BRIEF DESCRIPTION OF THE DRAWINGS

Additional objects and features of the invention will be more readily apparent from the following detailed description and appended claims when taken in conjunction with the drawings, in which:

FIGS. 6A and 6B depicts a flow chart describing the procedure of the closed-loop control system of the preferred embodiment;

DETAILED DESCRIPTION OF A PREFERRED EMBODIMENT

Figure 1:
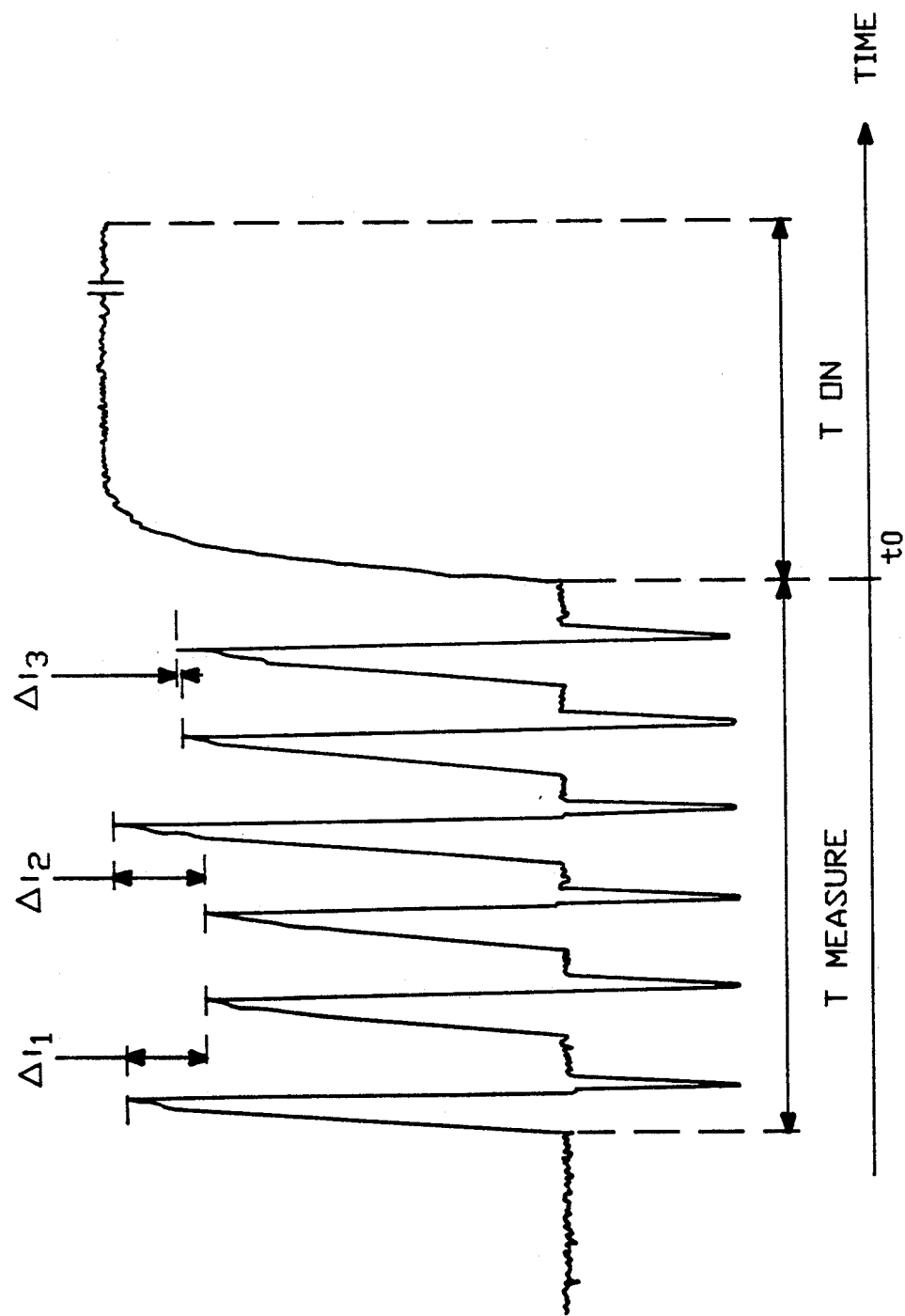
FIG. 1 illustrates the total current pulse structure for a position detection system for a three phase brushless DC motor.

FIG. 1 represents the total current pulse structure flowing into an exemplary three phase brushless DC motor as a result of the present invention. The six short current pulses used to determine the rotor position, as described in U.S. patent application Ser. No. 413,311 "Position Detection for a Brushless DC Motor", are clearly shown during time $t_{measure}$. A long duration current pulse, also depicted in FIG. 1, is then applied to a select phase combination during time $t_{on}$. The selection of the phase combination to energize is based on the current rotor position.

To understand the motor start-up and acceleration process, two cases must be considered:

Case 1: Based on Newton's equations, the sustained torque produces a motion of the motor rotor: $T_1+T_2+T_3-T_{LOAD}\neq 0$.

Case 2: Based on Newton's equations, the sustained torque does not produce a motion of the motor rotor: $T_1+T_2+T_3-T_{LOAD}=0$.

Where the torque components produced by the motor are:

$$T_1 = \frac{d\Psi PM1}{dt} \cdot \frac{dt}{d\alpha} \cdot i_1 \qquad [1]$$

$$T_2 = \frac{d\Psi PM2}{dt} \cdot \frac{dt}{d\alpha} \cdot i_2$$

$$T_3 = \frac{d\Psi PM3}{dt} \cdot \frac{dt}{d\alpha} \cdot i_3$$

Continuing with Newton's equations:

$$J\frac{d\Omega}{dt} = T_1 + T_2 + T_3 - T_{LOAD} \qquad [2]$$

$$\frac{d\alpha}{dt} = \Omega \qquad [3]$$

Where:
 $T_1$=torque produced by phase 1
 $T_2$=torque produced by phase 2
 $T_3$=torque produced by phase 3
 $T_{LOAD}$=total load torque (viscous torque, friction torque, load torque, etc.)

J = total inertia (motor + load)
Ω = motor rotor speed
α = motor rotor position with: α = electrical = p· α geometrical
p = number of pairs of permanent magnet poles
ΨPM1 = excitation flux in phase 1
ΨPM2 = excitation flux in phase 2
ΨPM3 = excitation flux in phase 3
$i_1$ = current in phase 1
$i_2$ = current in phase 2
$i_3$ = current in phase 3
t = time The application of case 1 or case 2 depends on the long duration current application time $t_{on}$. The time $t_{on}$ is the time during which a sustained torque is produced. Defining a sequence as the time $t_{measure} + t_{on}$, then the average torque produced during one sequence of position detection and rotor acceleration can be expressed as follows:

$$T_{sequence} = \frac{1}{t_{on} + t_{measure}} \int_{t_o}^{t_o + t_{on}} (T_1 + T_2 + T_3) \cdot dt \quad [4]$$

If $t_{on}$ is of fixed duration, then several problems may occur.

$t_{on}$ is too short

If $t_{on}$ is too short, the sequence torque, $T_{sequence}$, produced is less than the load torque, $T_{LOAD}$. Consequently, if the motor is at a standstill, it could not start, and conversely, if the motor is operating at a very low speed, it could not accelerate.

$T_{on}$ is too long

If $t_{on}$ is too long, a significant sustained torque is produced because $T_{sequence}$ is much larger than $T_{LOAD}$, and consequently an acceleration of the motor can be obtained. However, if $t_{on}$ is excessively long, the motor will rotate, and then oscillate around a stable position defined by the phase combination energized during $t_{on}$. In other words, the motor accelerates, then as $t_{on}$ is too long, the motor (which is expecting the next phase switching) begins to oscillate around a stable position. In most applications, an oscillation of the rotor is not acceptable.

The present invention avoids this major disadvantage by implementing a phase energization duration $t_{on}$ as a function of the motor speed. An adaptive $t_{on}$ optimizes the rotor control by effectively controlling sequence torque providing smooth acceleration from standstill. However, at start and low speed, no motor speed information is available without the use of sensors to base the $t_{on}$ adaptation upon.

The present invention defines a procedure which determines if the motor can be accelerated without the use of sensors. If acceleration is possible, $t_{on}$ for the next sequence is decreased. On the other hand, if the motor cannot be accelerated, i.e., the rotor is in the same location as previously determined, then $t_{on}$ is temporarily maintained at its present duration.

Figure 2:
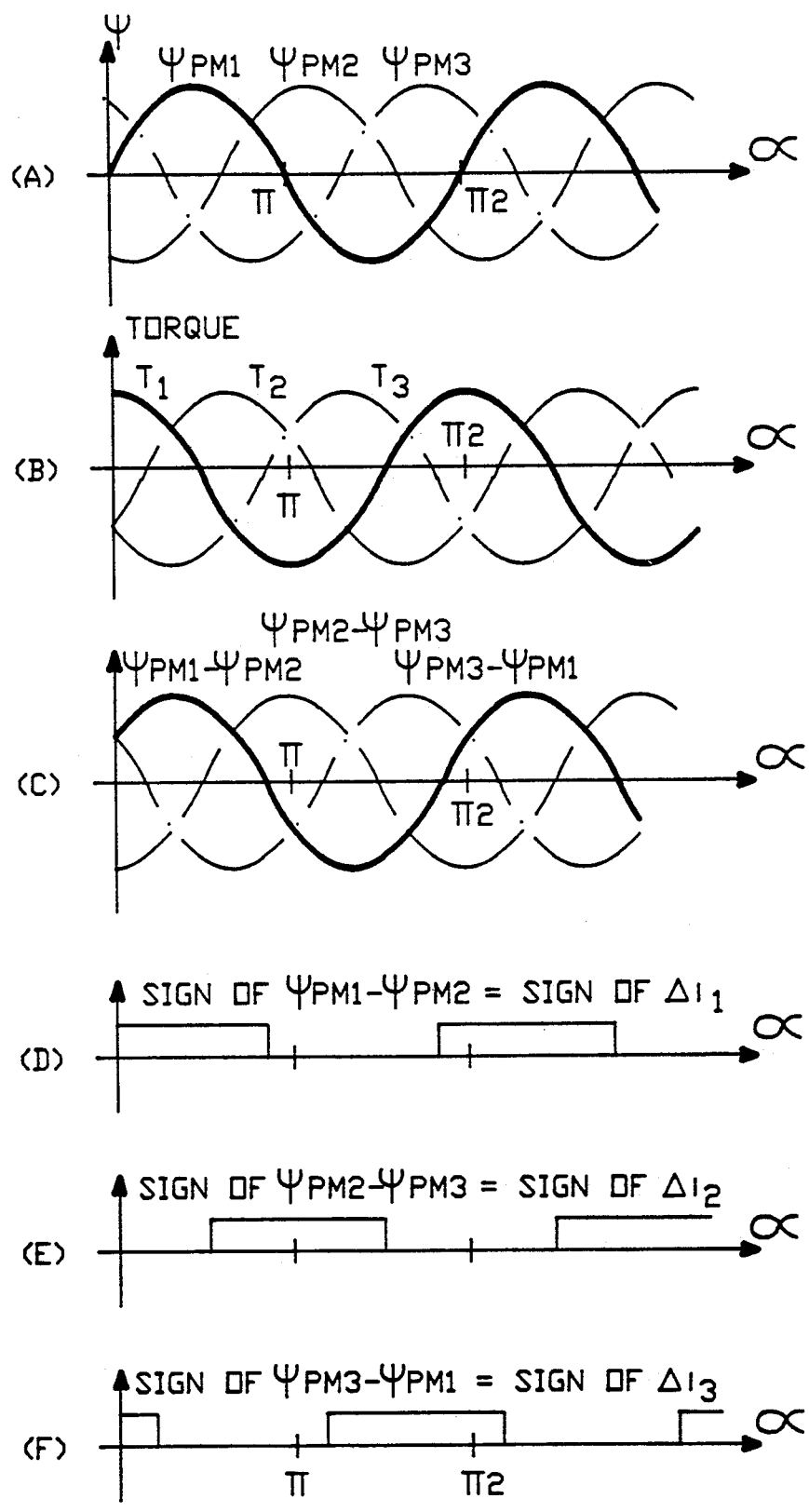
FIG. 2 illustrates flux distribution versus torque versus the sign of the resulting current difference in a motor being energized to determine motor position. See "Position Detection for a Brushless DC Motor," U.S. patent application Ser. No. 413,311. The top line, Line A, represents the different excitation flux in the phases, $\Psi$ PM1, $\Psi$ PM2, $\Psi$ PM3, versus the motor rotor position. The second line, Line B, represents the different phase torques, T1, T2, T3, and thereby illustrates the static torque which can be created. The third line, line C, shows the flux differences, the first difference $\Psi$ PM1−$\Psi$ PM2, the second difference $\Psi$ PM2−$\Psi$ PM3, the third difference $\Psi$PM3−$\Psi$ PM1. The fourth line, Line D, represents the current difference $\Delta i_1$. The fifth line, Line E, represents the current difference sign $\Delta i_2$. The sixth line, Line F, represents the current difference sign $\Delta i_3$.

The dynamic behavior of an exemplary three-phase motor can be understood with the aid of FIG. 2 and Table 1. FIG. 2 depicts the flux and torque distributions for each phase in the motor, graphs A, B, and C. The sign of the difference of the applied short current pulses are presented in graphs D, E, and F of FIG. 2. Additionally, Table 1 tabulates the relationship between the sign of the current differences and the rotor location measured in electrical degrees. The location provides the state function that describes the phases to energize to accelerate the rotor in the proper direction.

TABLE 1

| Electrical Degree | Sign of | | | State Function of | | |
|---|---|---|---|---|---|---|
| | Δi1 | Δi2 | Δi3 | i1 | i2 | i3 |
| 0–30 | 1 | 0 | 1 | 1 | 0 | 0 |
| 30–90 | 1 | 0 | 0 | 1 | 1 | 0 |
| 90–150 | 1 | 1 | 0 | 0 | 1 | 0 |
| 150–210 | 0 | 1 | 0 | 0 | 1 | 1 |
| 210–270 | 0 | 1 | 1 | 0 | 0 | 1 |
| 270–330 | 0 | 0 | 1 | 1 | 0 | 1 |
| 300–360 | 1 | 0 | 1 | 1 | 0 | 0 | with: state function
$i_1 = \Delta i_2$
$i_2 = \Delta i_3$
$i_3 = \Delta i_1$

Figure 3:
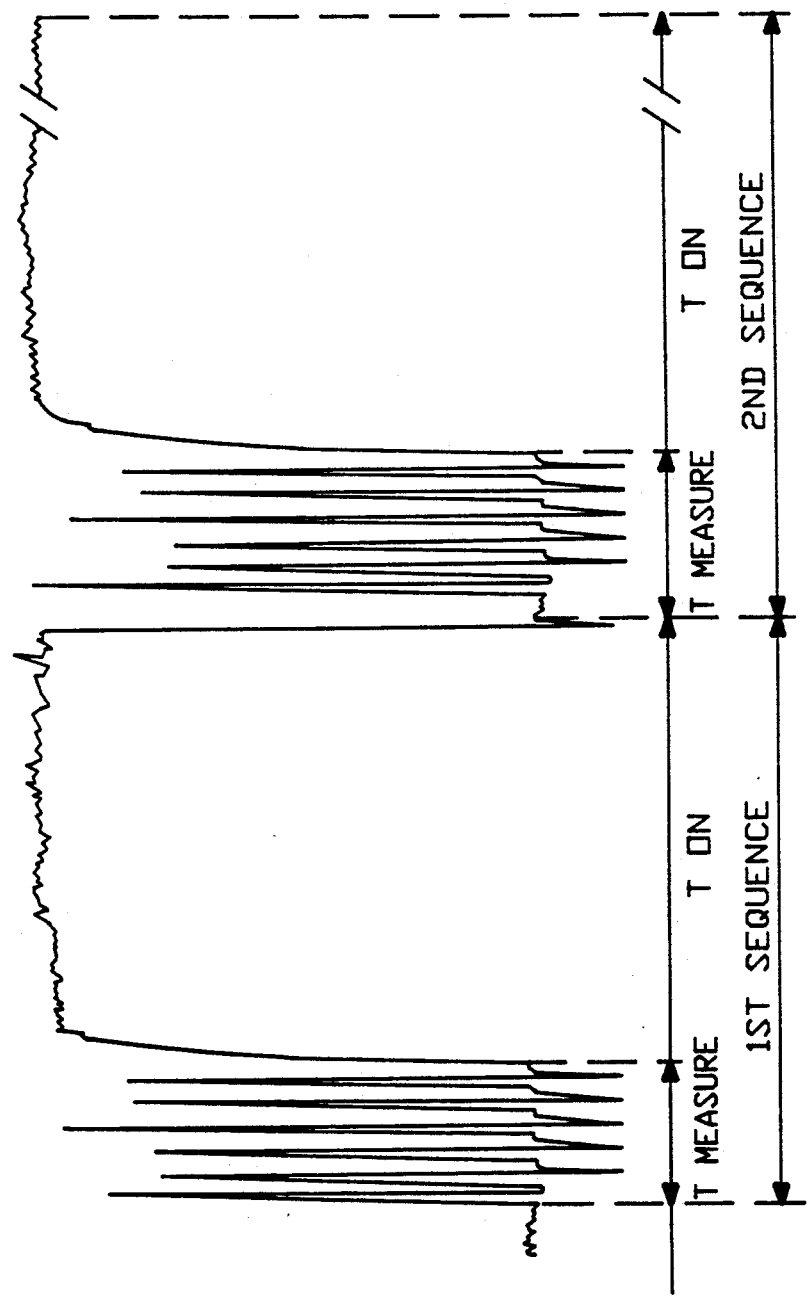
FIG. 3 illustrates the total current into a three phase brushless DC motor during the first and second sequences of operation of the present invention.

Assuming, for example, that the motor is at standstill inside the boundaries 30–90 electrical degrees. The motor position is detected by applying the short current pulses of opposite polarity to all of the phases, six pulses in all. From the amplitudes of the current pulses, the differences $\Delta i_1, \Delta i_2, \Delta i_3$ are determined. The sign of the measured current differences define the state function of $i_1, i_2, i_3$ from Table 1. This phase combination produces a sustained torque over the duration of $t_{on}$, and the motor starts to move in the correct direction. FIG. 3 represents the first two sequences. Once the first sequence is complete, a new measure of the motor position is processed during the $t_{measure}$ time. At this point, two cases must be considered.

Case 1

If the new measurement of the rotor position reveals the same sign distribution of $\Delta i_1, \Delta i_2, \Delta i_3$ as the previous determination, then the motor is still inside the same boundaries, corresponding in this example to 30–90 electrical degrees. This means that the motor cannot be accelerated, and consequently, $t_{on}$ is not decreased. The same phase combination will be energized using the same duration $t_{on}$ in an effort to move the rotor into the next boundary position.

Case 2

Figure 4:
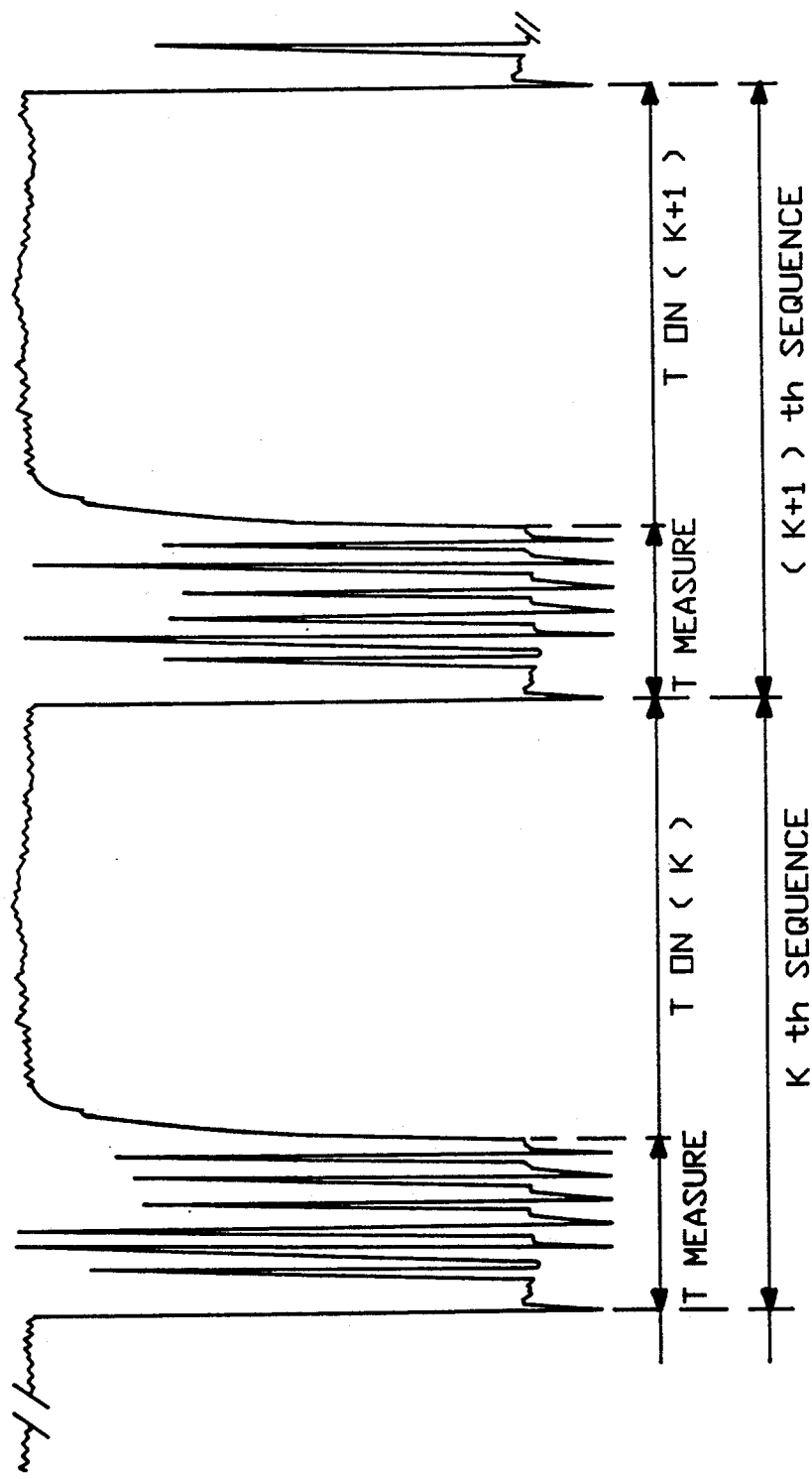
FIG. 4 illustrates the total current into a three phase brushless DC motor during the K th and (K+1) sequences, during which the rotor is accelerating.

If the new measurement of the rotor position reveals a different sign distribution of $\Delta i_1, \Delta i_2, \Delta i_3$ as compared to the previous determination, then the motor rotor has moved and is inside new boundaries, for example 90–150 electrical degrees. A new phase combination must be energized (according to the above state table, Table 1) during the succeeding time $t_{on}$ to achieve constant motion. As the motor accelerates, the duration of $t_{on}$ is decreased incremental be ΔT. FIG. 4 represents the total motor current during acceleration. The detection of the motor position during sequence K+1 is different from the detection of the motor position during sequence K. During acceleration, the time $t_{on}$ (K+1) satisfies:

$$t_{on}(K+1) = t_{on}(K) - \Delta T$$

By comparing the actual motor position to the previous one, an algorithm can be defined in order to determine the appropriate duration of $t_{on}$. This algorithm is summarized as follows:

If: New motor position determination = old motor position determination
Then: $t_{on}$ (new) = $t_{on}$ (old) (No change)
If: New motor position determination ≠ old motor position determination
Then: $t_{on}$ (new) = $t_{on}$ (old) − ΔT (motor accelerates)

Figure 5:
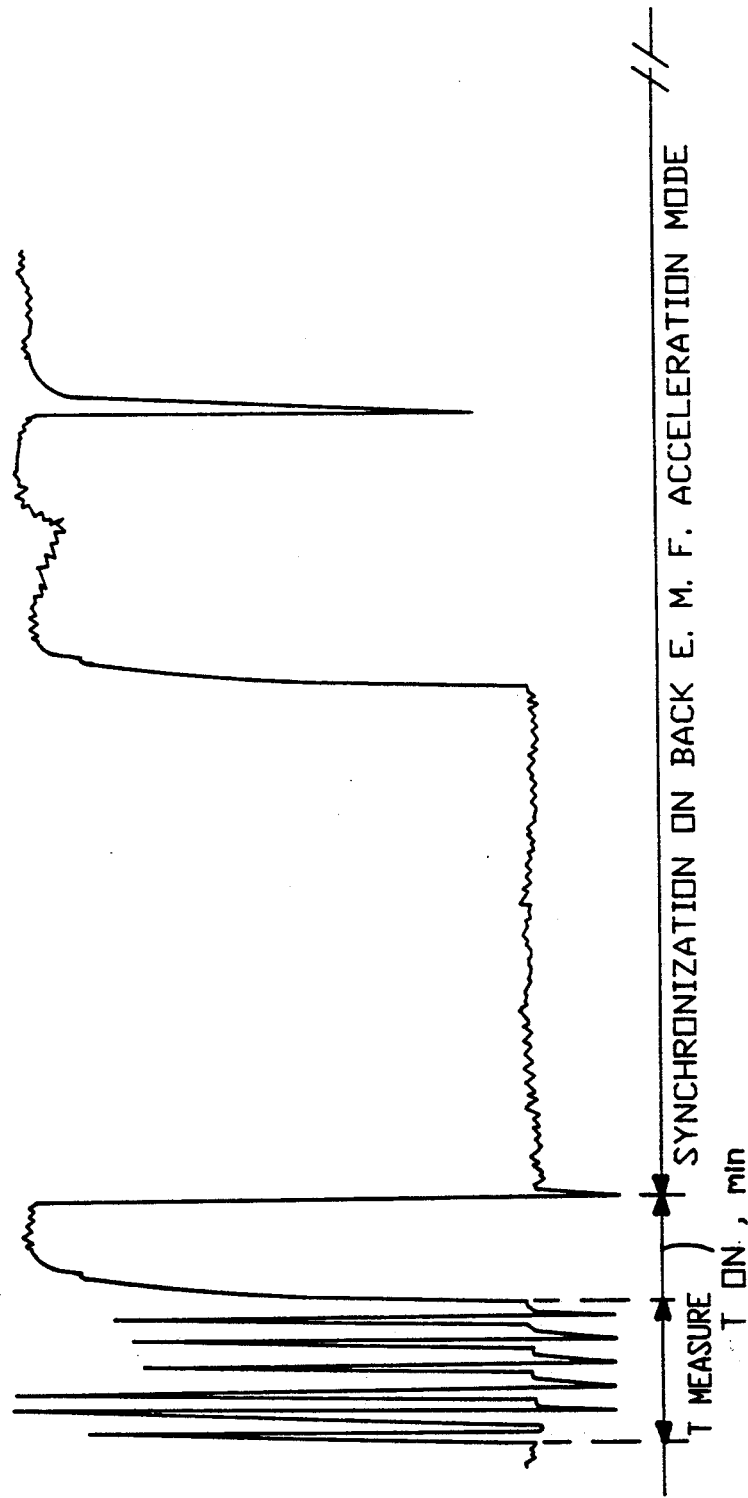
FIG. 5 illustrates the total current into a three phase brushless DC motor during the last sequence and subsequent synchronization on the back E.M.F. acceleration mode.

When $t_{on}$ reaches a minimum value set to $t_{on}$ min, the motor is running at a medium speed considered fast enough to enable the well known back EMF acceleration control system to function. FIG. 5 shows the last current pulse sequence and the synchronization of the back EMF acceleration system. In summary, the sequence of events of the present invention during acceleration are:

1) $t_{on} = t_{on}$ max First sequence
2) $\Delta t$ = decrement of $t_{on}$ after each sequence
3) $t_{on} = t_{on}$ min Last sequence
4) Back EMF acceleration control system continues acceleration.

However, in some cases of high motor friction, it is possible that the time $t_{on}$ will not reach $t_{on}$ min. As a security feature, a counter will count the number of sequences effectuated. If the counter reaches a predetermined value, the back EMF acceleration control system is activated in an attempt to synchronize on the back EMF signal even though its amplitude will be very small due to the motor's slow speed.

The major advantage of this approach is that no outside device is necessary to measure the speed. A complete sensorless approach is used. Furthermore, in the case of large motor friction which is dependant upon motor speed (for example, the friction due to the read/write heads on a hard disc), the present invention will adapt to the friction variation.

Figure 6B:
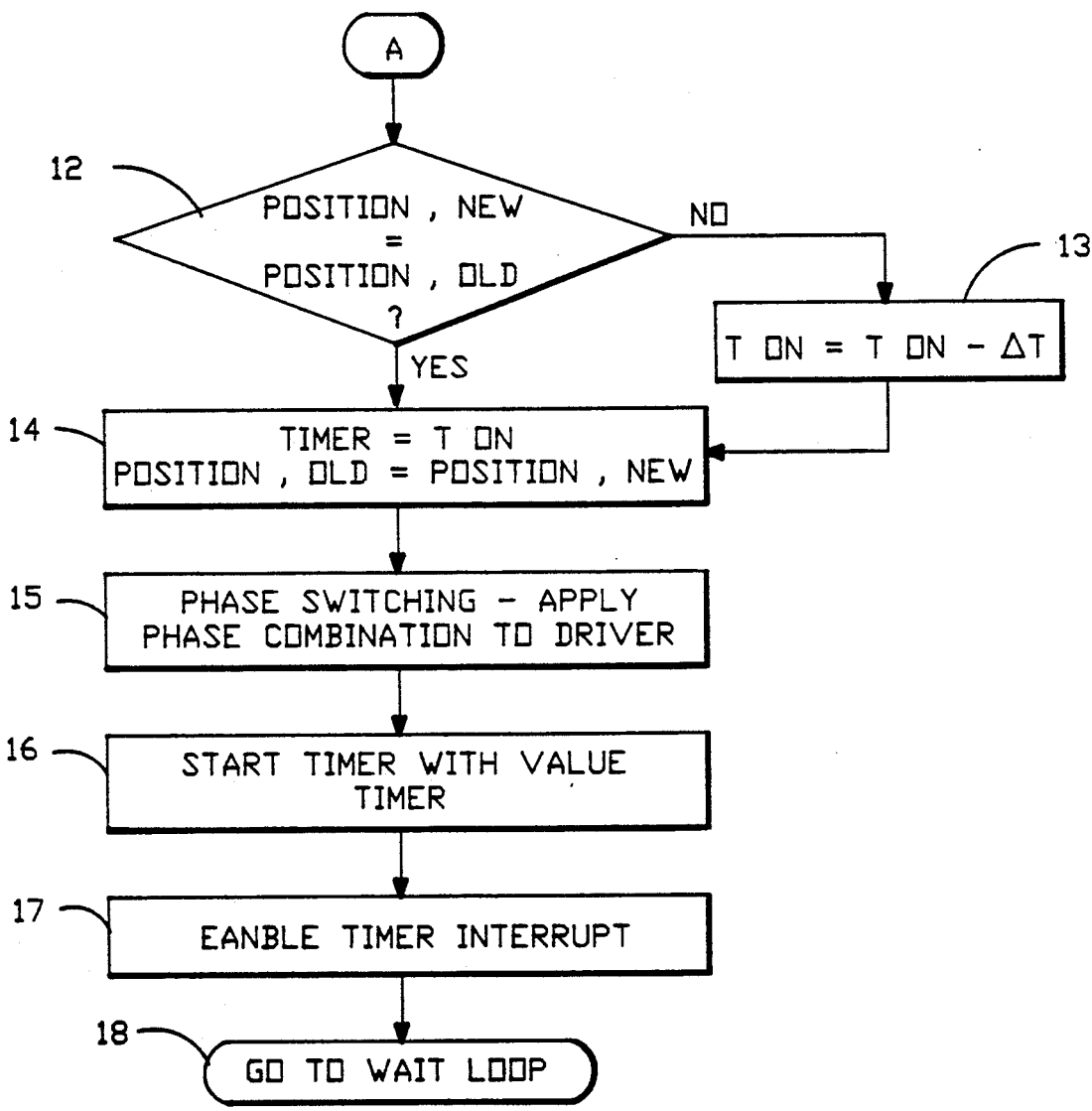

FIGS. 6A and 6B depict, in flow chart form, the complete algorithm of the present invention which can be easily implemented in a microprocessor.

BRIEF DESCRIPTION OF PROCEDURE OF FIGS. 6A AND 6B

At Step 1, the counter STARTER is initialized to zero and the time $t_{on}$ is initialized to the maximum value, $t_{on}$ max. Step 2 disables the timer interrupt (when procedure is implemented in a microprocessor), Step 2 is also the address at which the program will start when a timer interrupt 4 occurs. Step 3 increments the counter STARTER after each sequence is processed. Step 5 is a test on the counter STARTER. If the number of sequences is greater than STARTER,max, a pre-determined value, the next step will be step 8, corresponding to the tentative decision to synchronize the acceleration process on the back EMF acceleration mode. If the sequence number is smaller than STARTER,max, then the following step is Step 6.

Step 6 is a test which compares the actual time of the phase combination duration $t_{on}$ with the minimum acceptable value $t_{on}$ min, which has been pre-determined. If $t_{on}$ is equal to $t_{on}$ min, the next step will be Step 8, corresponding to the tentative decision to synchronize the acceleration process on the back EMF acceleration mode. If $t_{on}$ is larger than $t_{on}$ min, indicating that the motor has not reached a medium speed, a complete new position measurement and motor drive sequence is initiated in Step 7.

Figure 7:
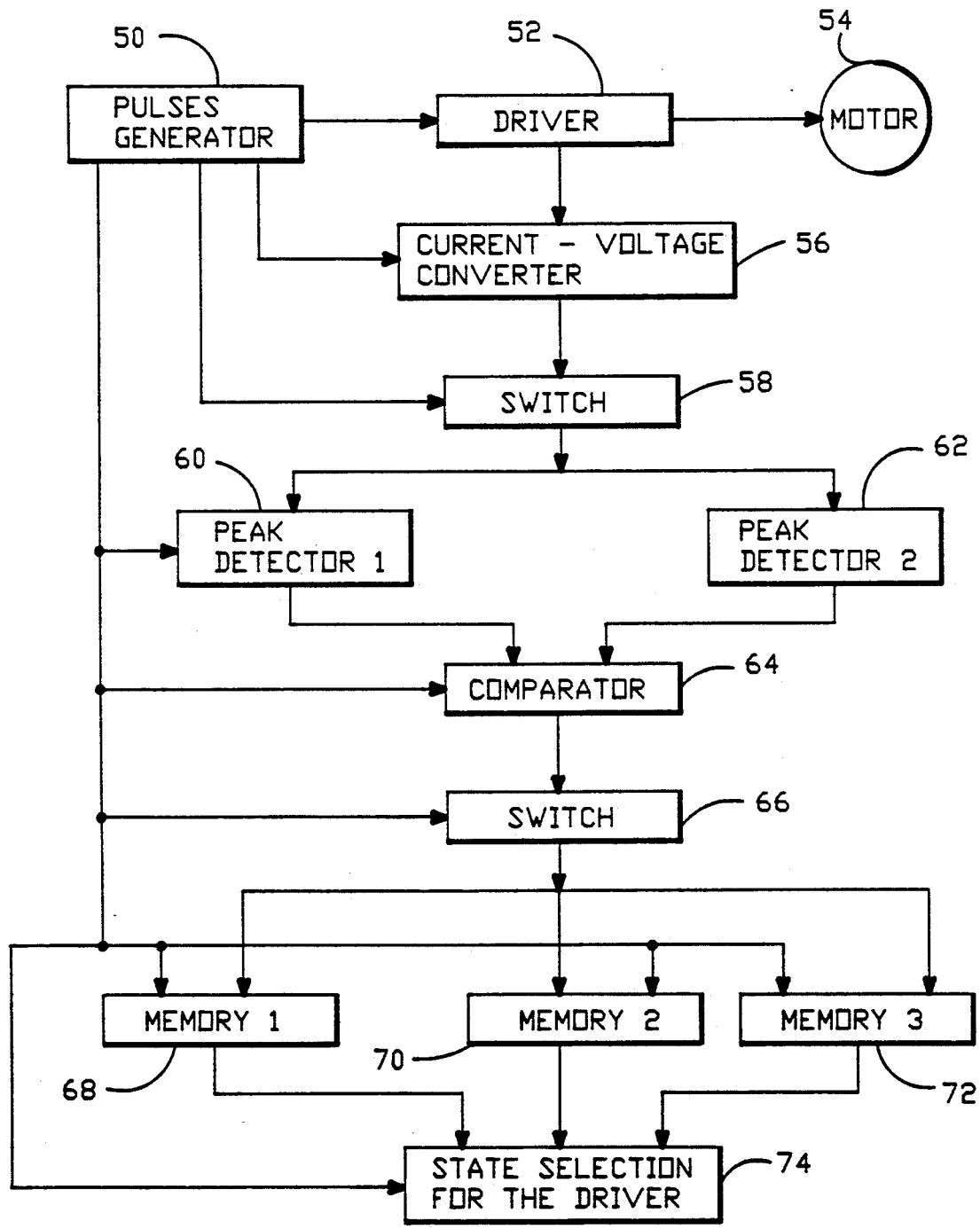
FIG. 7 is a block diagram of the circuitry used to detect rotor position in the present invention.

Step 7 corresponds to the determination of the motor rotor position as described in "Position Detection For a Brushless DC Motor", U.S. patent application Ser. No. 413,311. A block diagram of the process used to measure motor position at standstill in the present invention is provided in FIG. 7 for a three-phase motor 54. The position detection process as described below is not intended to be exhaustive, but merely exemplary.

According to this exemplary process, using a pulse generator 50 through a driver 52, each phase of a motor 54 is supplied first with a positive current. The resulting current is converted to a voltage through a current voltage converter 56. Each phase is supplied the current for a short time T. The value of the current, after time T, is stored by use of a switch 58 in a peak detector 60. The same phase is next energized using a negative current through driver 52, and the resulting current converted to a voltage at converter 56 and through switch 58 stored at peak detector 62. The two peak current values are compared at comparator 64, with the difference in magnitude not being established, but only the sign of the magnitude. The sign of the current difference is routed via switch 66 to a memory 68.

The above procedure is repeated for each other phase or set of phases. In the case of a three-phase motor, this means that three signs are determined at comparator 64, with the second result being stored in memory 70 and the third result at memory 72. Based on the signs of the current differences obtained as described above, and using a look-up table 74 (Table 1) shown previously, a state selection of the phase or phases to be energized in order to start the motor moving in a chosen direction is determined 74.

Figure 8:
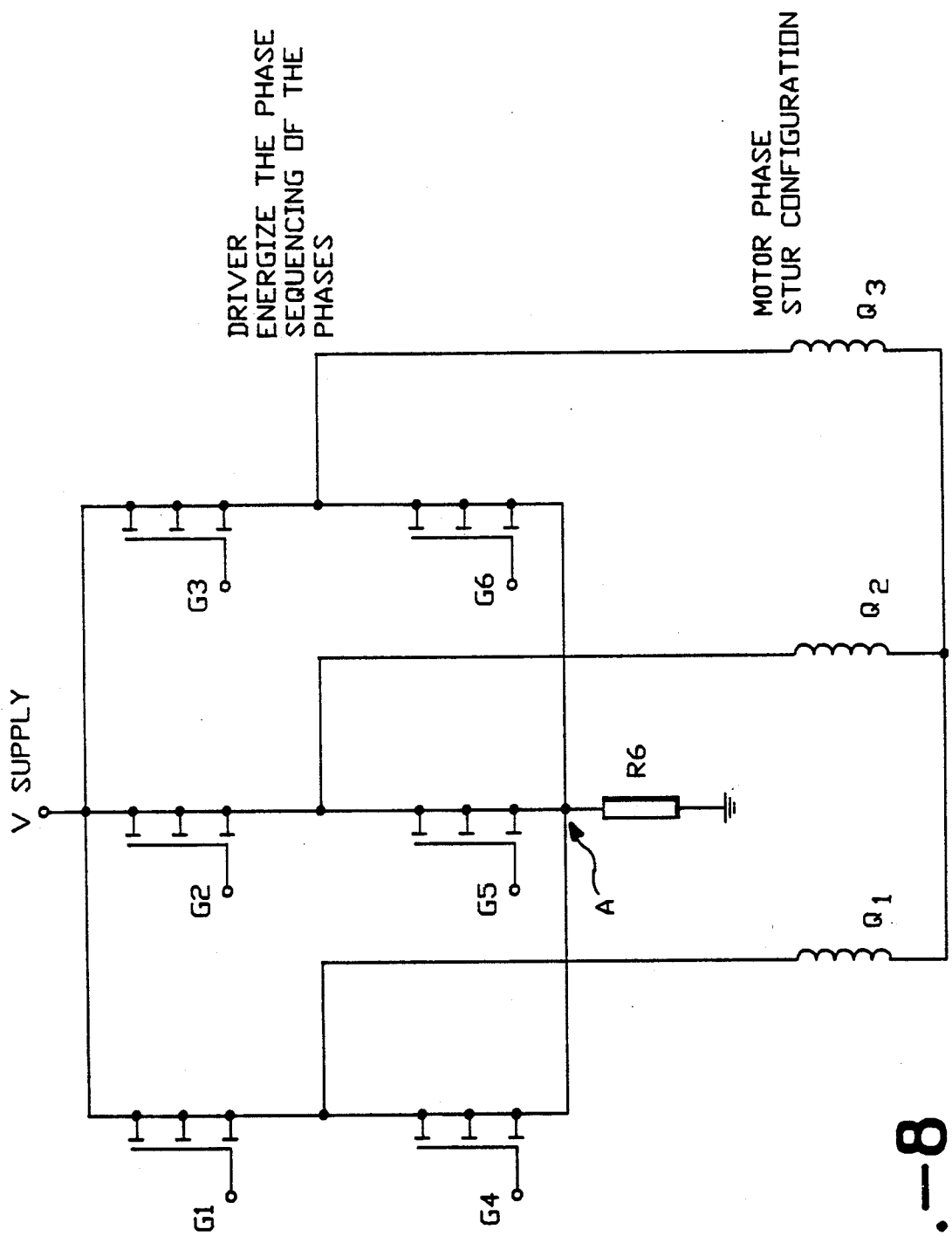
FIG. 8 is a schematic diagram of the phase energization circuitry of the present invention.

This last part of the method, that is selection of the phases to be energized in order to start the motor in the chosen direction, can be explained with respect to FIG. 8.

Considering, for example, a star configuration of the phases as illustrated in FIG. 8, the measurement of the current difference is made when two phases in series are energized for each possible configuration. These configurations are: Phase 1 and Phase 2 in series; Phase 1 and Phase 3 in series; and Phase 2 and Phase 3 in series. The first combination of Phase 1 and Phase 2 is energized to cause a current to pass therethrough by turning on transistors G1 and G5, causing the current to pass from G1 through Phase 1 to Phase 2 and through the resistor R6 to ground, with the current being measured at the point A.

These transistors are switched off, and a current in the opposite direction is caused to pass through the same series pair of phases by turning on transistors G2 and G4 with the current being measured at the same point. The difference in the currents is then determined either by subtraction of the values, or by first integration and then determination of the difference, or differentiation and determination of the difference, each variation is explained in the above cited patent application. The sign difference is stored as a one or zero representing positive or negative, respectively. The convention to be adopted in explaining this specific example is that if the signs of the current difference is positive, the function will be considered to be equal to one; if the sign of the current difference is negative, then the function is considered to be equal to zero. The remaining current differences for the phase configuration are measured by appropriate
switching of the transistor G1-G6.

Based on the sign of the current difference $\Delta i_1$, $\Delta i_2$, $\Delta i_3$, the state function of the phase current $i_1$, $i_2$, $i_3$ is determined as shown in Table 1 above. The register Position, in Step 7, is then equal to the state function of the current difference $\Delta i_1$, $\Delta i_2$, $\Delta i_3$.

The real time necessary to accomplish Step 7 corresponds to $t_{measure}$. Once Step 7 is complete, Step 9 initializes the register Position,old by testing if the counter STARTER is equal to 1. If STARTER equals 1, then Step 10 occurs. Step 10 initializes the register Position,old. Position,old equals the actual measured position.

Step 11 determines register Position,new, where Position,new is equal to register Position determined during Step 7. Step 12 compares register Position,new with register Position,old, thus determining if the motor rotor is (or not) within the same boundaries as determined previously. Step 12 determines if the motor can be accelerated (thus decreasing $t_{on}$) or if the motor cannot be accelerated (thus not changing $t_{on}$). Step 13 decrements $t_{on}$ by the pre-determined value $\Delta T$. Step 14 initializes timer register Timer to the $t_{on}$ value determined in Steps 12 and 13. The register position,old is then updated to Position,new in preparation for the next sequence. Step 15 switches ON or OFF the different transistors, $G_1$ through $G_6$ of FIG. 8, based on the state function of current $i_1$, $i_2$, $i_3$ defined in Table 1. The state table which has been determined using the sign of the current difference $\Delta i_1$, $\Delta i_2$, $\Delta i_3$ in Step 7. Thus, the motor phases are supplied by current creating a sustained torque and motor rotor motion in the correct direction. Step 16 starts the timer with the value contained in register Timer (see Step 14). Consequently, the timer will measure a time duration equal to $t_{on}$.

Step 17 enables the timer interrupt after it has counted to a time equal to $t_{on}$. The sequence is complete after Step 17. The process must wait until the time $t_{on}$ has past. The process remains in a wait loop (or accomplishing other tasks not requested by the present invention) represented by Step 18 until the next sequence is to begin.

Any interrupt of the timer will provoke the process to restart at address 4 (Timer interrupt) for a new sequence determination. The only exit to the process is by satisfying the tests of Step 5, a predetermined number of sequences has been effectuated without $t_{on}$ obtaining the minimum value or Step 6, $t_{on}$ reaches a predetermined minimum value. If either test is satisfied, the acceleration control function is handed to a secondary technique of Step 8. Preferably, the secondary technique is a back EMF detection system that will accelerate the motor to a nominal operating speed.

While the present invention has been described with reference to one embodiment, the description is illustrative of the invention and is not to be construed as limiting the invention. Various modifications may occur to those skilled in the art without departing from the true spirit and scope of the invention as defined by the appended claims.

What is claimed is:

1. In a brushless direct current motor having multiple windings arranged as a stator and a permanent magnet rotor, apparatus for controlling ordered application of electrical current to the stator windings and measuring the response thereto comprising:
   circuit means coupled to said stator windings for selectively establishing current paths through a selected stator winding in response to control signals;
   driver means for applying short duration current pulses of first and second opposite polarities to each said selected stator winding and for applying long duration current pulses to said selected stator winding to accelerate said magnetic rotor;
   monitoring means for detecting the voltage detected at a current voltage converter connected to the energized phase;
   detection means for identifying a rotational position of said magnetic rotor relative to said stator windings based on the sign of the difference between the response to said pulses applied to the same said selected stator winding; and
   control means for controlling the periodic application of said short duration pulses based upon said rotational position of said magnetic rotor and for controlling the periodic application and duration of said long duration pulses based upon said rotational position of said magnetic rotor.

2. The apparatus of claim 1 wherein said monitoring means includes a peak voltage detector.

3. The apparatus at claim 1 wherein said control means for controlling the periodic application and duration of said long duration pulses further includes timing means for adaptively varying said duration of said long duration pulses based upon the speed of said motor.

4. The apparatus of claim 3 wherein said timing means includes means for decrementing said long duration pulses by a fixed amount upon determination of each new position of said rotor.

5. The apparatus of claim 4 wherein said decrementing means includes means for switching said detection means based on the sign of the difference of said short duration pulses to a secondary detection means when said long duration pulses are decremented to a minimum value.

6. The apparatus of claim 1 wherein said control means includes safety means for switching said detection means based on the sign of the difference of said short duration pulses to a secondary detection means when a fixed number of said long duration pulse application sequences have occurred.

7. The apparatus of claim 5 or claim 6 wherein said secondary detection means is a back EMF detection technique.

8. In a brushless direct current motor having multiple windings arranged as a stator and a permanent magnet rotor, a method for controlling ordered periodic application of electrical current to said stator windings and measuring the response thereto to determine the initial position of said rotor and to accelerate said rotor to a medium speed comprising the steps of:
   coupling circuit means to said stator windings for selectively establishing current paths through a selected stator winding in response to control signals;
   applying short duration current pulses of first and second opposite polarities to each said selected stator winding;
   detecting the voltage detected at a current voltage converter to said selected stator winding by each of said applied current pulses of opposite polarities;
   identifying a rotational position of said magnetic rotor relative to said stator windings based on the sign of the difference between the response to said pulses applied to the same said selected stator winding;
   applying a first long duration current pulse to said selected stator winding based upon said identified rotational position of said magnetic rotor to accelerate said magnetic rotor;
   repeating said rotational position identification process to identify a new position of said magnetic rotor;
   applying a second long duration current pulse of a shorter duration than said first long duration current pulse to a new selected stator winding based upon said identified new rotational position of said magnetic rotor;

repeating said rotational position identification process to identify a new position of said magnetic rotor and repeatedly applying said long duration current pulse with a shortened duration for each said repetition to a selected stator winding based on said new position of said magnetic rotor;

ceasing said repetitive application of said long duration current pulses at such time that said long duration pulses are shortened to a predetermined duration; and applying a secondary technique to control the acceleration of said magnetic rotor upon ceasing application of said long duration current pulses.

9. The method of claim 8, wherein said step of ceasing said repetitive application of said long duration current pulses is accomplished at such time when a fixed number of current application repetitions has occurred.

10. The method of claim 8 including a step of applying said second long duration current pulse which is identical in duration and applied to the same selected stator winding as said first long duration current pulse, if said new rotational position is identical to said rotational position.

11. The method of claim 8, wherein said secondary technique to control the acceleration of said magnetic rotor upon ceasing application of said long duration current pulses is a back EMF detection technique.

12. In a brushless direct current motor having multiple windings arranged as a stator and a rotor having a direct current excitation rotor windings, apparatus for controlling ordered application of electrical current to said rotor windings and measuring said rotor windings thereto comprising:

circuit means coupled to said rotor windings for selectively establishing current paths through a selected rotor winding in response to control signals;

driver means for applying short duration current pulses of first and second opposite polarities to each said selected rotor winding and for applying long duration current pulses to said selected rotor windings to accelerate said magnetic rotor;

monitoring means for detecting the voltage detected at a current voltage converter connected to the energized phase;

detection means for identifying a rotational position of said magnetic rotor relative to said stator based on the sign of the difference between the response to said pulses applied to the same said selected rotor windings; and control means for controlling the periodic application of said short duration pulses based upon said rotational position of said magnetic rotor and for controlling the periodic application and duration of said long duration pulses based upon said rotational position of said magnetic rotor.

13. The apparatus of claim 12 wherein said monitoring means includes a peak voltage detector.

14. The apparatus at claim 12 wherein said control means for controlling the periodic application and duration of said long duration pulses further includes timing means for adaptively varying said duration of said long duration pulses based upon the speed of said motor.

15. The apparatus of claim 14 wherein said timing means includes means for decrementing said long duration pulses by a fixed amount upon determination of each new position of said rotor.

16. The apparatus of claim 15 wherein said decrementing means includes means for switching said detection means based on the sing of the difference of said short duration pulses to a secondary detection means when said long duration pulses are decremented to a minimum value.

17. The apparatus of claim 12 wherein said control means includes safety means or switching said detection means based on the sign of the difference of said short duration pulses to a secondary detection means when a fixed number of said long duration pulse application sequences have occurred.

18. The apparatus of claim 16 or claim 17 wherein said secondary detection means is a back EMF detection technique.

19. In a brushless direct current motor having multiple windings arranged as a stator and a rotor having a direct current excitation rotor winding, a method for controlling ordered periodic application of electrical current to said rotor windings and measuring the response thereto to determine the initial position of said rotor and to accelerate said rotor to a medium speed comprising the steps of:

coupling circuit means to said rotor windings for selectively establishing current paths through a selected rotor winding or windings in response to control signals;

applying short duration current pulses of first and second opposite polarities to each said selected rotor winding;

detecting the voltage detected at a current voltage converter to said selected rotor winding by each of said applied current pulses of opposite polarities;

identifying a rotational position of said magnetic rotor relative to said stator based on the sign of the difference between the response to said pulses applied to the same said selected rotor winging;

applying a first long duration current pulse to said selected rotor winding based upon said identified rotational position of said magnetic rotor to accelerate said magnetic rotor;

repeating said rotational position identification process to identify a new position of said magnetic rotor;

applying a second long duration current pulse of a shorter duration than said first long duration current pulse to a new selected rotor winding based upon said identified new rotational position of said magnetic rotor;

repeating said rotational position identification process to identify a new position of said magnetic rotor and repeatedly applying said long duration current pulse with a shortened duration for each said repetition to a selected rotor winding based on said new position of said magnetic rotor;

ceasing said repetitive application of said long duration current pulses at such time that said long duration pulses are shortened to a predetermined duration; and applying a secondary technique to control the acceleration of said magnetic rotor upon ceasing application of said long duration current pulses.

20. The method of claim 19, wherein said step of ceasing said repetitive application of said long duration current pulses is accomplished at such time when a fixed number of current application repetitions has occurred.

21. The method of claim 19 including a step of applying said second long duration current pulse which is identical in duration and applied to the same selected rotor winding as said first long duration current pulse, if said new rotational position is identical to said rotational position.

22. The method of claim 19, wherein said secondary technique to control the acceleration of said magnetic rotor upon ceasing application of said long duration current pulses is a back EMF detection technique.

23. The apparatus of claim 1 wherein said selected stator winding is a combination of two or more stator windings.

24. The method of claim 8 wherein said selected stator winding is a combination of two or more stator windings.

25. The apparatus of claim 12 wherein said selected rotor winding is combination of two or more rotor windings.

26. The method of claim 19 wherein said selected rotor winding is a combination of two or more rotor windings.

27. The apparatus of claim 1 wherein said control means includes safety means for switching said detection means based upon the sign of the difference of said short duration pulses to a secondary detection means when a preselected criteria occurs.

28. The apparatus of claim 12 wherein said control means includes safety means for switching said detection means based upon the sign of the difference of said short duration pulses to a secondary detection means when a preselected criteria occurs.

* * * * *